United States Patent
Ding et al.

(10) Patent No.: US 8,301,085 B2
(45) Date of Patent: Oct. 30, 2012

(54) MOBILE STATION AND METHOD TO SELECT AN AMPLIFYING PATH THEREOF

(75) Inventors: Guo-Zhi Ding, Shanghai (CN); Xu Liu, Shanghai (CN); Teng-Huei Chu, Taipei (TW)

(73) Assignees: Ambit Microsystems (Shanghai) Ltd., Shanghai (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 424 days.

(21) Appl. No.: 12/770,736

(22) Filed: Apr. 30, 2010

(65) Prior Publication Data

US 2011/0183634 A1 Jul. 28, 2011

(30) Foreign Application Priority Data

Jan. 22, 2010 (CN) .......................... 2010 1 0300568

(51) Int. Cl.
*H04B 1/40* (2006.01)
*H04B 17/00* (2006.01)

(52) U.S. Cl. ..... 455/84; 455/67.11; 455/105; 455/277.2

(58) Field of Classification Search ............... 455/67.11, 455/78, 83, 84, 101, 103, 105, 115.1, 115.3, 455/226.1, 226.2, 269, 272, 277.1, 277.2, 455/278.1, 280, 283
See application file for complete search history.

(56) References Cited

U.S. PATENT DOCUMENTS

| | | | | |
|---|---|---|---|---|
| 5,311,190 A | * | 5/1994 | Devendorf et al. | 342/157 |
| 6,472,952 B1 | * | 10/2002 | Sakai et al. | 333/126 |
| 7,899,420 B2 | * | 3/2011 | Nakamura et al. | 455/126 |
| 8,019,289 B2 | * | 9/2011 | Gorbachov | 455/83 |
| 8,195,103 B2 | * | 6/2012 | Waheed et al. | 455/115.1 |
| 2006/0063494 A1 | | 3/2006 | Zhang et al. | |

* cited by examiner

*Primary Examiner* — Quochien B Vuong
(74) *Attorney, Agent, or Firm* — Altis Law Group, Inc.

(57) ABSTRACT

A mobile station communicates with an access point (AP). The mobile station includes a low noise amplifier (LNA) path, a power amplifier (PA) path, a switch to select the LNA path or the PA path, and a controller directing the switch. The controller estimates amplifying power of the LNA, transmitting power and a sensitivity threshold of the PA. The controller receives a current received signal strength indication (RSSI) value of the AP. The controller determines whether amplifying power of the LNA path exceeds the PA sensitivity threshold. The controller transmits a selection signal directing the switch to select the LNA path if the amplifying power of the LNA path exceeds the sensitivity threshold of the PA.

15 Claims, 4 Drawing Sheets

MOBILE STATION AND METHOD TO SELECT AN AMPLIFYING PATH THEREOF

BACKGROUND

1. Technical Field

Embodiments of the present disclosure relate to mobile stations, and particularly to a mobile station and a method to select an amplifying path to amplify signals applied in the mobile station.

2. Description of Related Art

A mobile station often comprises a power amplifier (PA) or a low noise amplifier (LNA) to amplify received signals or sent signals. However, each of the PA and LNA has own advantage and disadvantage. In detail, the PA is adept in amplifying signals, but needs more power. The LNA saves power, but is weak in amplifying signals.

Thus, integration of both the PA and LNA as two amplifying paths in the mobile station is preferable. An unaddressed need correspondingly exists in the mobile station to select one amplifying path from the two.

DETAILED DESCRIPTION

Figure 1:
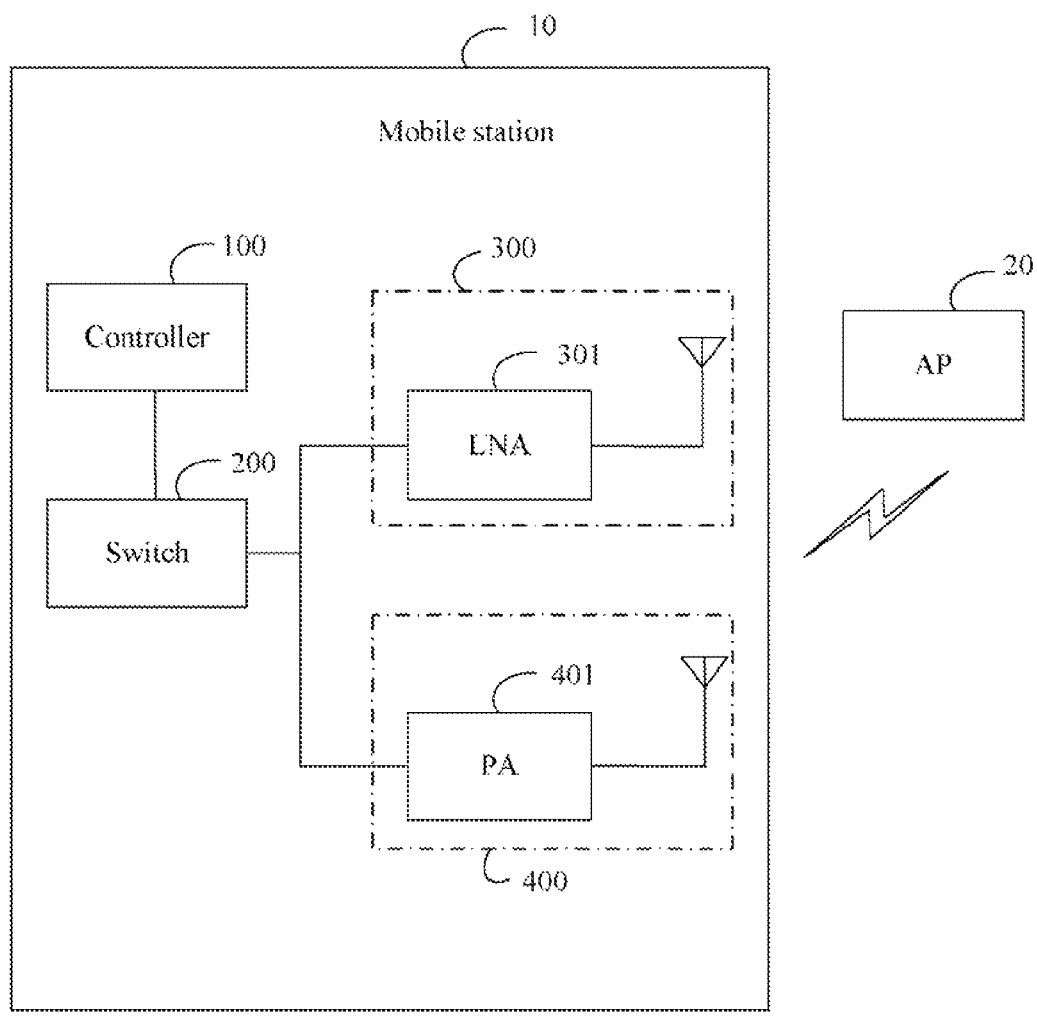
FIG. 1 is a schematic diagram of one exemplary embodiment of an application environment and basic components of a mobile station of the present disclosure.

Referring to FIG. 1, one exemplary embodiment of an application environment and basic components of a mobile station 10 are shown. The mobile station 10 communicates with an access point (AP) 20.

The mobile station 10 comprises a controller 100, a switch 200, a low noise amplifier (LNA) path 300, and a power amplifier (PA) path 400. In one embodiment, an LNA 301 defines the LNA path 300, and a PA 401 defines the PA path 400. The mobile station 10 selects either the LNA path 300 or the PA path 400 as an amplifying path as a means to amplify signals, such as RF signals. In the embodiment, the LNA path 300 is selected to amplify signals when an amplifying power of the LNA path 300 exceeds a current received signal strength indication (RSSI) value of the AP 20. The PA path 400 is selected to amplify signals when the amplifying power of the LNA path 300 is within the current received signal strength indication (RSSI) value of the AP 20. Because power consumption of the LNA 301 is less than that of the PA 401, the mobile station 10 can save power when the mobile station 10 selects the LNA path 300. The controller 100 controls the switch 200 to switch between the LNA path 300 or the PA path 400. A default path selected by the mobile station 10 is the PA path 400, to ensure communication quality.

Figure 2:
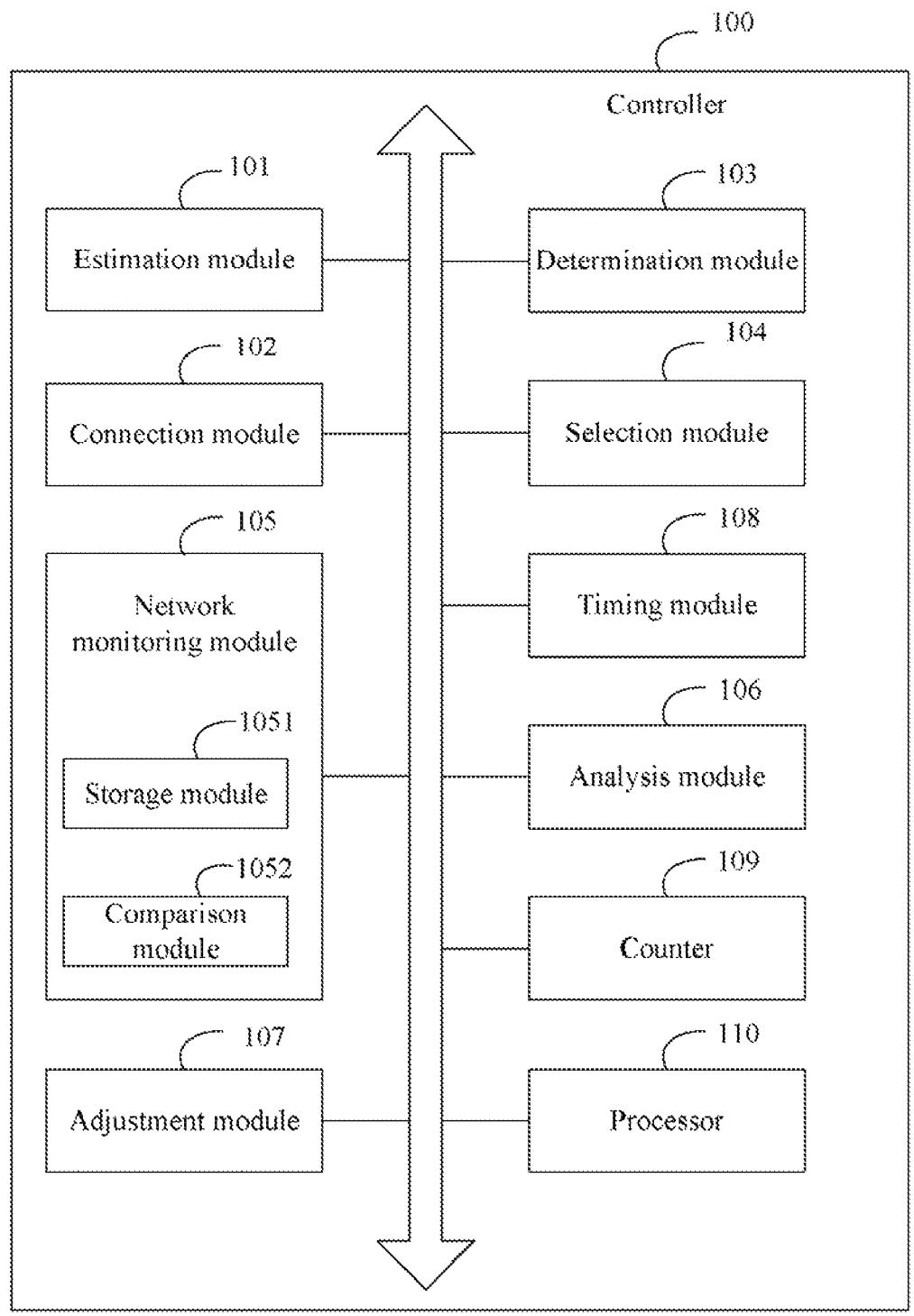
FIG. 2 is a block diagram of one exemplary embodiment of a controller in the mobile station of the present disclosure.

Referring to FIG. 2, one exemplary embodiment of the controller 100 in the mobile station 10 is shown. The controller 100 comprises an estimation module 101, a connection module 102, a determination module 103, a selection module 104, a network monitoring module 105, an analysis module 106, an adjustment module 107, a timing module 108, a counter 109, and a processor 110.

The aforementioned modules 101-109 may include one or more computerized instructions executed by the processor 110.

The estimation module 101 estimates amplifying power of the LNA 301, transmitting power and a sensitivity threshold of the PA 401. It should be understood that the transmitting power and the sensitivity threshold of the PA 401 is defined to be the common transmitting power and the minimal receiving power of the PA 401, respectively.

The connection module 102 communicates with the AP 20, to acquire the RSSI value of the AP 20. In one embodiment, the RSSI value can be variable.

The determination module 103 determines whether amplifying power of the LNA path 300 exceeds the sensitivity threshold of the PA 401, according to the amplifying power of the LNA 301, the transmitting power and the sensitivity threshold of the PA 401, and the RSSI value. The amplifying power of the LNA path 300 is equal to the amplifying power of the LNA 301 subtracting a difference of the transmitting power of the PA 401 and the current RSSI value of the AP 20.

The difference between the transmitting power of the PA and the current RSSI value indicates possible loss between the mobile station 10 and the AP 20.

The selection module 104 transmits a selection signal to the switch 200 for directing the switch 200 to select the LNA path 300 if the power of the LNA path 300 exceeds the sensitivity threshold of the PA 401.

The timing module 108 generates a first time interval and a second time interval. In one embodiment, the first time interval may be equal to the second time interval. In other embodiment, the first time interval may be unequal to the second time interval. The timing module 108 generates the first time interval if the switch 200 switches to the LNA path 300. Alternatively, the timing module 108 generates the second time interval if the switch 200 switches to the PA path 400.

The network monitoring module 105 determines stability of a network on which the mobile station 10 is located within the first time interval, and directs the selection module 104 to send the selection signal to the switch 200 to select the PA path 400 if the network is unstable.

The network monitoring module 105 comprises a storage module 1051 and a comparison module 1052. The storage module 1051 stores a minimal data rate of the network. The comparison module 1052 determines whether a current data rate of the network exceeds the minimal data rate, and determines the network is stable if exceeded, and the network is unstable if not exceeded.

The selection module 104 further transmits the selection signal to the switch 200, to select the PA path 400, if the network is unstable.

The analysis module 106 determines whether the selection to the PA path 400 is based on the unstable network.

The counter 109 calculates the number of selections of PA path 400 based on the unstable network within the second time interval, and generates an alarm signal if the calculated number exceeds a predefined stable value.

The adjustment module 107 increases the sensitivity threshold of the PA 401 after receiving the alarm signal from the counter 109, and determines whether the increased sensitivity threshold of the PA 401 exceeds the power of the LNA 301. Furthermore, the adjustment module 107 transmits the increased sensitivity threshold of the PA 401 to the estimation module 101 if the increased sensitivity threshold of the PA 401 exceeds the power of the LNA 301, and discards the increased sensitivity threshold of the PA 401 if the increased sensitivity threshold of the PA 401 is within the power of the LNA 301. It may avoid frequent switching due to the imprecise sensitivity threshold of the PA 401, by increasing the PA 401 sensitivity threshold.

Figure 3:
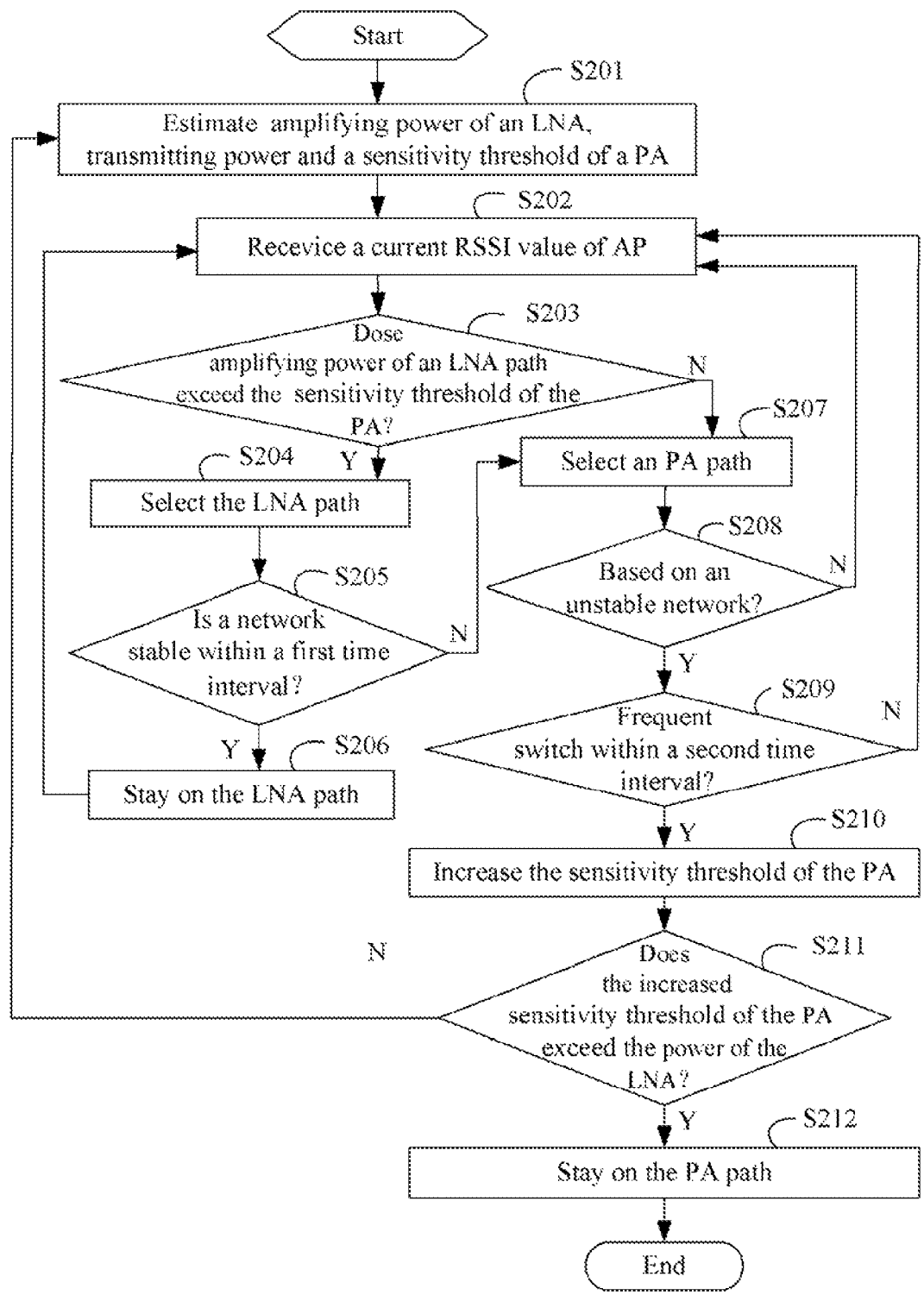
FIG. 3 is a flowchart of one exemplary embodiment of a method to select an amplifying path of the present disclosure.

Referring to FIG. 3, one exemplary embodiment of a method to select an amplifying path to amplify signals applied in a controller such as, for example, that 100 of FIG. 1 and FIG. 2 is shown. The method of selecting an amplifying path to amplify signals is accomplished by function modules such as those of FIG. 2. A default path selected by the mobile station 10 is a PA path 400. The default path is an amplifying path selected by the mobile station 10 primarily. The following blocks of FIG. 3 allow selection of an improved amplifying path. Depending on the embodiment, additional blocks may be added, others deleted, and the ordering of the blocks may be changed.

In block S201, an estimation module 101 estimates amplifying power of the LNA 301, transmitting power and a sensitivity threshold of the PA 401. In one embodiment, the terms of the transmitting power and the sensitivity threshold of the PA 401 mean the common transmitting power and the minimal receiving power of the PA 401, respectively.

In block S202, a connection module 102 receives a current received signal strength indication (RSSI) value of the AP 20.

In block S203, a determination module 103 determines whether amplifying power of the LNA path 300 exceeds the sensitivity threshold of the PA 401, according to the amplifying power of the LNA 301, the transmitting power and the sensitivity threshold of the PA 401, and the RSSI value of the AP 20.

In one embodiment, the amplifying power of the LNA path 300 is equal to the power of the LNA subtracting a difference of the transmitting power of the PA and the current RSSI value.

If the amplifying power of the LNA path 300 exceeds the sensitivity threshold of the PA 401, in block S204, a selection module 104 transmits a selection signal to the switch 200, directing the switch 200 to select the LNA path 300.

In block S205, a network monitoring module 105 determines whether a network on which the mobile station 10 is located is stable within the first time interval.

If the network is stable, in block S206, the switch 200 stays on the LNA path 300, and then block S202 is repeated to acquire a current RSSI value of the AP 20.

If amplifying power of the LNA path 300 is within the sensitivity threshold of the PA 401 determined by block S203, or if the network is unstable determined by block S205, in block S207, the selection module 104 transmits the selection signal to the switch 200 to select the PA path 400.

In block S208, an analysis module 106 determines whether the selection of the PA path 400 is based on the unstable network. In one embodiment, block S202 is repeated to acquire a current RSSI value of the AP20, if the selection of the PA path 400 is based on the unstable network.

If the selection of the PA path 400 is based on the unstable network, in block S209, a counter 109 determines whether the switch 200 frequent switches within a second time interval, calculating the number of selections of the PA path 400 due to network instability within the second time interval, and compares the result with a predefined stable value, if based on the unstable network. If the counter 109 determines the switch 200 has frequent switched, block S202 is repeated. Otherwise, block S210 is implemented, if not frequent switched.

In block S210, an adjustment module 107 increases the sensitivity threshold of the PA 401. It may avoid frequent switching due to the imprecise sensitivity threshold of the PA 401, by increasing the sensitivity threshold of the PA 401.

In block S211, the adjustment module 107 determines whether the increased sensitivity threshold of the PA 401 exceeds the power of the LNA 301. Block S201 is repeated, to send the increased sensitivity threshold of the PA 401 to the estimation module 101, if the increased sensitivity threshold of the PA 401 is within the power of the LNA 301.

If the increased sensitivity threshold of the PA 401 exceeds the power of the LNA 301, in block S212, the switch 200 stays on the PA path 400, and the adjustment module 107 discards the increased sensitivity threshold of the PA 401.

Figure 4:
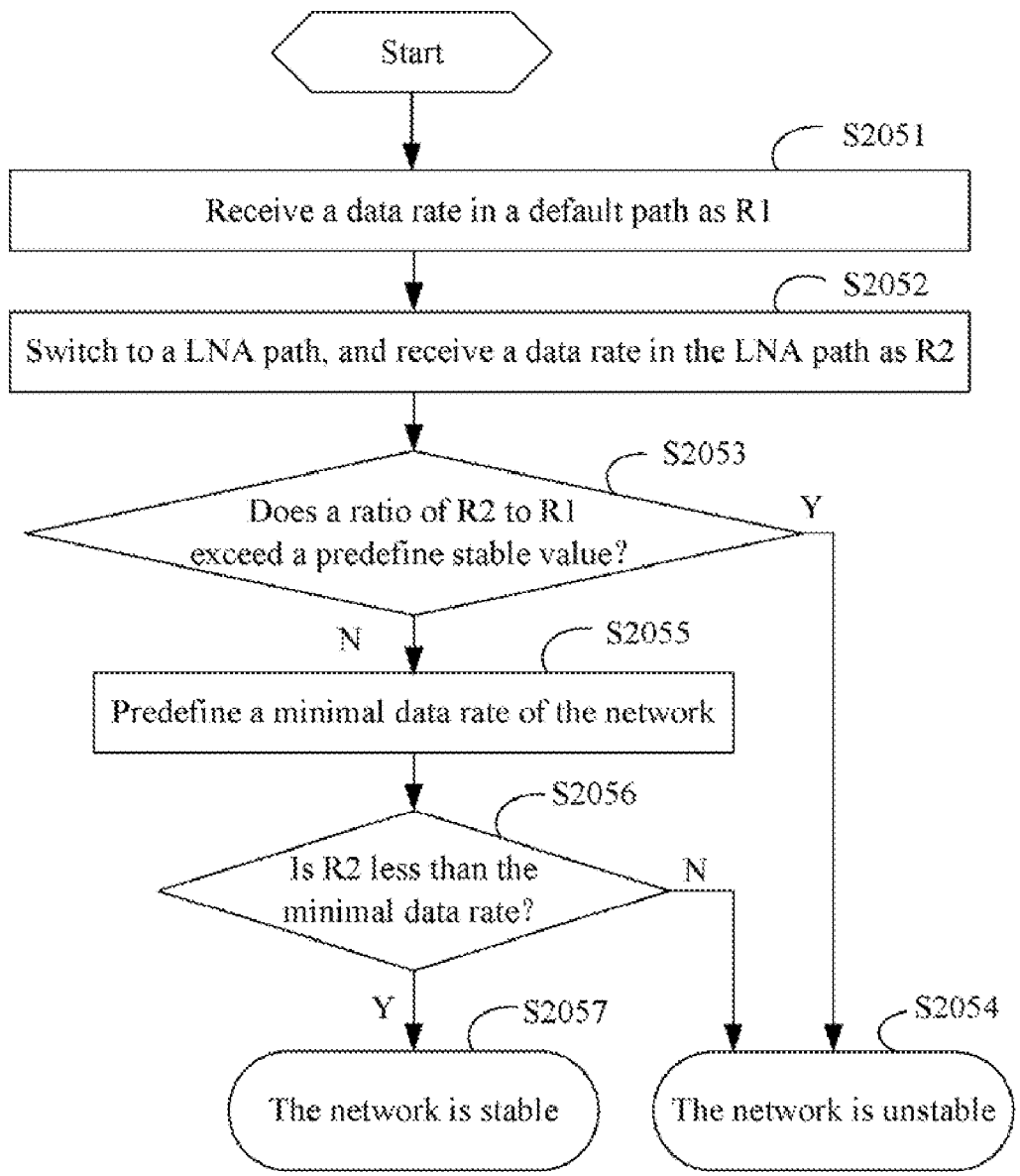
FIG. 4 is a flowchart of one exemplary embodiment of a method to determine network stability in accordance with the present disclosure.

FIG. 4 is a flowchart of one exemplary embodiment of a method to determine network stability in accordance with the present disclosure is shown. Depending on the embodiment, additional blocks may be added, others deleted, and the ordering of the blocks may be changed.

In block S2051, the storage module 1051 receives a data rate in the default path as R1. As mentioned, the default path selected by the mobile station 10 is the PA path 400.

In block S2052, the storage module 1051 receives a data rate in the LNA path 300 as R2, when the switch 200 switches to the LNA path 300.

In block S2053, the comparison module 1052 determines whether a ratio of R2 to R1 exceeds a predefined stable value. The ratio of R2 to R1 exceeding the predefined stable value means the communication quality has declined too fast. For example, if R1 is approximately 48 Mbps, R2 is approximately 12 Mbps, and the predefined stable value is 2, then the comparison module 1052 determines that the ratio of R2 to R1 exceeds a predefined stable value, that is, the communication quality has declined too fast.

If the ratio of R2 to R1 exceeds a predefined stable value, the network quality declines too much, in block S2054, the comparison module 1052 determines the network is unstable.

If the ratio of R2 to R1 is within a predefined stable value n block S2055, the storage module 1051 predefines a minimal data rate of the network. The minimal data rate is a limitation to meet a demand of the network status.

In block S2056, the comparison module 1052 determines whether R2 is less than the minimal data rate. Block S2054 is implemented if R2 is less than the minimal data rate, and block S2055 is implemented if R2 is more than or equal to the minimal data rate.

Determination of the network status is sent from the network monitoring module 105 to the selection module 104, which then selects the amplifying path accordingly, and communication quality is assured.

The description of the present disclosure has been presented for purposes of illustration and description, and is not intended to be exhaustive or limited to the disclosure in the form disclosed. Many modifications and variations will be apparent to those of ordinary skill in the art. Various embodiments were chosen and described in order to best explain the principles of the disclosure, the practical application, and to enable others of ordinary skill in the art to understand the disclosure for various embodiments with various modifications as are suited to the particular use contemplated.

What is claimed is:

1. A mobile station in communication with an access point (AP), the mobile station comprising:
   a low noise amplifier (LNA) defining an LNA path;
   a power amplifier (PA) defining a PA path; and
   a controller directing a switch to switch between the LNA path and the PA path, the controller comprising:
   an estimation module to estimate amplifying power of the LNA, transmitting power and a sensitivity threshold of the PA;

a connection module communicating with the AP, to acquire a current received signal strength indication (RSSI) value of the AP;

a determination module to determine whether amplifying power of the LNA path exceeds the sensitivity threshold of the PA, according to the amplifying power of the LNA, the transmitting power and the sensitivity threshold of the PA, and the RSSI value; and a selection module to send a selection signal to the switch directing the switch to select the LNA path if the amplifying power of the LNA path exceeds the sensitivity threshold of the PA.

2. The mobile station as claimed in claim 1, wherein the amplifying power of the LNA path is equal to the amplifying power of the LNA subtracting a difference of the transmitting power of the PA and the current RSSI value.

3. The mobile station as claimed in claim 1, wherein a default path selected by the mobile station is the PA path.

4. The mobile station as claimed in claim 3, wherein the controller further comprises a timing module, to generate a first time interval and a second time interval.

5. The mobile station as claimed in claim 4, wherein the controller further comprises a network monitoring module to determine whether a network on which the mobile station is located is stable within the first time interval, and inform the selection module to send the selection signal to the switch to select the PA path if the network is unstable.

6. The mobile station as claimed in claim 5, wherein the controller further comprises an analysis module, operable to analyze whether the selection signal to select the PA path is based on the unstable network.

7. The mobile station as claimed in claim 6, wherein the controller further comprises a counter, operable to calculate a number of selections of the PA path based on the unstable network within the second time interval, and generate an alarm signal if the calculated number exceeds a predefined stable value.

8. The mobile station as claimed in claim 7, wherein the controller further comprises an adjustment module, operable to increase the sensitivity threshold of the PA after receiving the alarm signal, and send the increased sensitivity threshold of the PA to the estimation module.

9. The mobile station as claimed in claim 8, wherein the adjustment module is further operable to determine whether the increased sensitivity threshold of the PA exceeds the power of the LNA, and discard the increased sensitivity of the PA if exceeded.

10. A method of selecting an amplifying path, applied in a mobile station, the mobile station communicating with an access point (AP), the mobile station comprising a low noise amplifier (LNA) defining an LNA path, a power amplifier (PA) defining a PA path, a switch for switching between the LNA path and the PA path, and a controller for generating a selection signal to direct the switch, and the method comprising:

estimating amplifying power of the LNA, a transmitting power of the PA, and a sensitivity threshold of the PA;

acquiring a current received signal strength indication (RSSI) value from the AP;

determining whether amplifying power of the LNA path exceeds the sensitivity threshold of the PA, according to the amplifying power of the LNA, the transmitting power of the PA, the sensitivity threshold of the PA and the RSSI value; and sending the selection signal to the switch directing the switch to select the LNA path, if the amplifying power of the LNA path exceeds the sensitivity threshold of the PA.

11. The method as claimed in claim 10, wherein the amplifying power of the LNA path is equal the power of the LNA subtracting a difference of the transmitting power of the PA and the current RSSI value.

12. The method as claimed in claim 10, wherein a default path selected by the mobile station is the PA path.

13. The method as claimed in claim 10, further comprising:
providing a first time interval and a second time interval;
determining whether a network on which the mobile station is located is stable within the first time interval;
staying on the selection of the LNA path, and repeating determination of network stability, to acquire a current RSSI value if the network status is stable; and
sending the selection signal to the switch to select the PA path if the network is unstable.

14. The method as claimed in claim 13, further comprising:
determining whether the selection signal to select the PA path is based on the unstable network;
if the selection signal to select the PA path is not based on the unstable network, going back to the step of determining whether a network on which the mobile station is located is stable within the first time interval;
if the selection signal to select the PA path is based on the unstable network, calculating a number of selections of the PA path based on the unstable network within the second time interval, and determining whether the result exceeds a predefined stable value;
if the result is within a predefined stable value, going back to the step of determining whether a network on which the mobile station is located is stable within the first time interval; and
if the result exceeds a predefined stable value, increasing the sensitivity threshold of the PA, going back to the step of determining whether the selection signal to select the PA path is based on the unstable network.

15. The method as claimed in claim 14, further comprising determining whether the increased sensitivity threshold of the PA exceeds the power of the LNA, and discarding the increased sensitivity threshold of the PA if the increased sensitivity threshold of the PA exceeds the power of the LNA.

\* \* \* \* \*